(12) United States Patent
Nielsen et al.

(10) Patent No.: US 11,364,492 B2
(45) Date of Patent: Jun. 21, 2022

(54) MONOLITHIC CARRIER STRUCTURE FOR DIGITAL DISPENSING

(71) Applicant: HEWLETT-PACKARD DEVELOPMENT COMPANY, L.P., Houston, TX (US)

(72) Inventors: Jeffrey A. Nielsen, Corvallis, OR (US); Michael W. Cumbie, Corvallis, OR (US); Devin Alexander Mourey, Corvallis, OR (US); Silam J. Choy, Corvallis, OR (US); Christie Dudenhoefer, Corvallis, OR (US); Kenneth Ward, Corvallis, OR (US)

(73) Assignee: Hewlett-Packard Development Company, L.P., Spring, TX (US)

( * ) Notice: Subject to any disclaimer, the term of this patent is extended or adjusted under 35 U.S.C. 154(b) by 608 days.

(21) Appl. No.: 16/085,342

(22) PCT Filed: Mar. 31, 2016

(86) PCT No.: PCT/US2016/025321
§ 371 (c)(1),
(2) Date: Sep. 14, 2018

(87) PCT Pub. No.: WO2017/171801
PCT Pub. Date: Oct. 5, 2017

(65) Prior Publication Data
US 2019/0083972 A1    Mar. 21, 2019

(51) Int. Cl.
*B41J 2/14*       (2006.01)
*B01J 19/00*      (2006.01)
(Continued)

(52) U.S. Cl.
CPC ......... *B01L 3/0268* (2013.01); *B01J 19/0046* (2013.01); *B41J 2/145* (2013.01);
(Continued)

(58) Field of Classification Search
None
See application file for complete search history.

(56) References Cited

U.S. PATENT DOCUMENTS 6,068,367 A    5/2000  Fabbri
6,188,414 B1   2/2001  Wong et al.
(Continued)

FOREIGN PATENT DOCUMENTS

EP    1204533 A1    5/2002
JP    H06209055     7/1994
(Continued)

OTHER PUBLICATIONS

Kuoni A. et al., Two-dimensional Parallel Dispenser for Microarray Printing, Oct. 2003, vol. 8, No. 5.

*Primary Examiner* — Matthew D Krcha
*Assistant Examiner* — Brittany I Fisher
(74) *Attorney, Agent, or Firm* — Dicke Billig & Czaja PLLC

(57) ABSTRACT

A digital dispense apparatus comprising a plurality of fluid dispense devices, at least one reservoir connected to the plurality of fluid dispense devices to deliver fluid to the plurality of fluid dispense devices, at least one contact pad array, and a single monolithic carrier structure.

14 Claims, 12 Drawing Sheets

(51) Int. Cl.
*B41J 2/145* (2006.01)
*B41J 2/155* (2006.01)
*B41J 2/16* (2006.01)
*B01L 3/02* (2006.01)
*B41J 2/175* (2006.01)

(52) U.S. Cl.
CPC ....... *B41J 2/14072* (2013.01); *B41J 2/14145* (2013.01); *B41J 2/155* (2013.01); *B41J 2/1603* (2013.01); *B41J 2/1623* (2013.01); *B41J 2/1637* (2013.01); *B41J 2/17553* (2013.01); *B01L 2400/0415* (2013.01); *B01L 2400/0439* (2013.01); *B41J 2202/18* (2013.01); *B41J 2202/20* (2013.01)

(56) References Cited

U.S. PATENT DOCUMENTS

| | | | |
|---|---|---|---|
| 6,228,659 | B1 | 5/2001 | Kowallis et al. |
| 6,833,112 | B2 | 12/2004 | Hoummady |
| 8,210,648 | B2 | 7/2012 | Xie et al. |
| 2002/0122748 | A1 | 9/2002 | Hirota et al. |
| 2003/0086828 | A1 | 5/2003 | Chiou et al. |
| 2008/0259125 | A1 | 10/2008 | Haluzak et al. |
| 2009/0047440 | A1* | 2/2009 | Giri .................... G01N 35/1016 427/457 |
| 2010/0261611 | A1 | 10/2010 | Peters |
| 2012/0051984 | A1 | 3/2012 | Dudenhoefer |
| 2012/0210580 | A1 | 8/2012 | Dietl |
| 2014/0193309 | A1* | 7/2014 | Still ...................... B01L 3/0268 422/500 |
| 2014/0297029 | A1* | 10/2014 | Peters .................. B01L 3/0268 700/241 |
| 2016/0009086 | A1 | 1/2016 | Choy et al. |
| 2016/0016404 | A1 | 1/2016 | Chen et al. |

FOREIGN PATENT DOCUMENTS

| | | |
|---|---|---|
| JP | H11192705 | 7/1999 |
| JP | 2004077490 | 3/2004 |
| JP | 2010524713 | 7/2010 |
| JP | 2013159068 | 8/2013 |
| TW | 200741202 A | 11/2007 |
| TW | 201109056 A | 3/2011 |
| WO | WO-2015116076 A1 | 8/2015 |
| WO | WO-2015163859 A1 | 10/2015 |
| WO | WO-2015041665 A1 | 3/2016 |
| WO | WO-2016032497 A1 | 3/2016 |

\* cited by examiner

US 11,364,492 B2

MONOLITHIC CARRIER STRUCTURE FOR DIGITAL DISPENSING

BACKGROUND

In the field of titration, digital titration is replacing manual or analogue titration because of its efficiency and precision. High precision digital titration apparatuses include replaceable, digital titration cassettes that are to be placed and replaced in a digital dispense host apparatus.

Digital titration cassettes are provided with a row of fluid dispense dies on a bottom side and an equal number of reservoirs on a top side. The fluid dispense dies can be discrete MEMSs (Micro-Electro-Mechanical Systems), wherein each die dispenses drops of between 11 pico-liters and 10 microliters in volume. The reservoirs are open at the top to receive fluid, for example from a pipette, and may have a narrower opening at the bottom to deliver the fluid to respective fluid dispensers at the bottom.

In operation, the dispensing dies dispense the fluid drops in wells of a well plate, e.g. micro- or multi-well plate, positioned below the cassette. For example each well may contain reagent for later analysis wherein the reagent components are at least partially determined by the digital titration host apparatus. Typically a digital titration host apparatus holds the cassette and the well plate. The host apparatus controls fluid ejection from the dies, to eject fluid into the wells. The host apparatus may properly position the cassette with respect to the well plate to dispense desired quantities of fluid in each predetermined well of the plate, for example by moving the dispensing cassette and well plate with respect to each other after each dispense action.

DRAWINGS

DESCRIPTION

Figure 1:
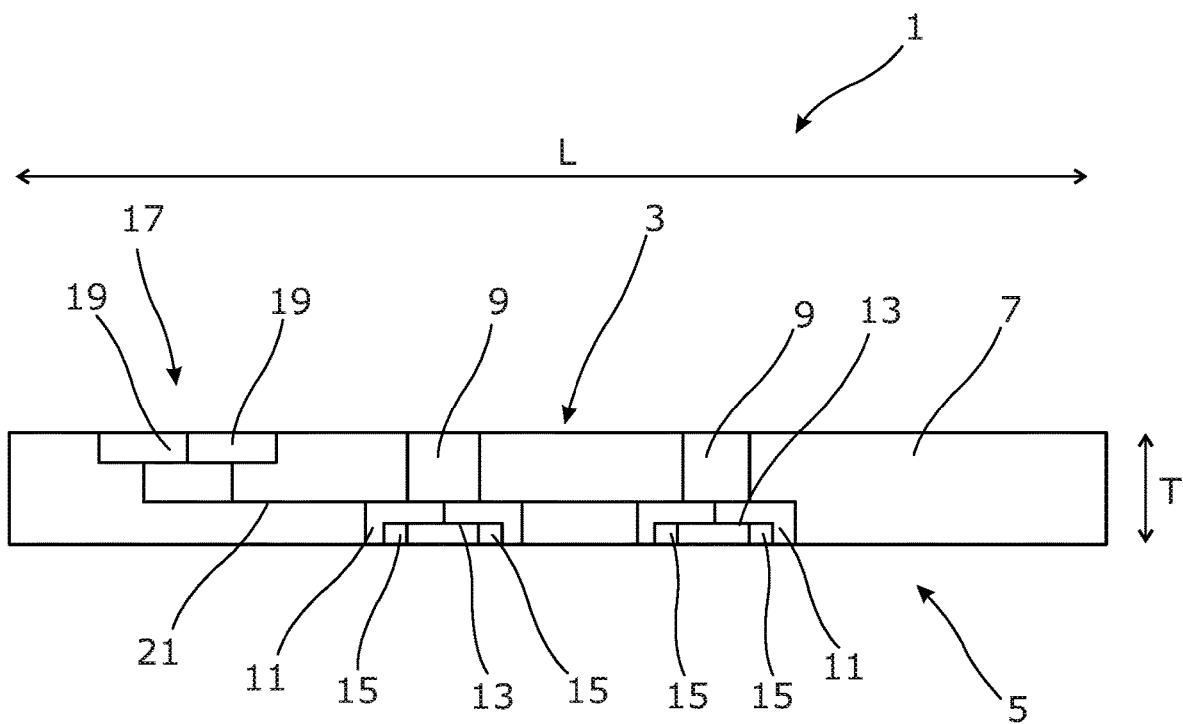
FIG. 1 illustrates a diagram of a cross sectional front view of an example dispense apparatus.

FIG. 1 illustrates an example of a digital dispense apparatus 1 in a diagrammatic cross sectional front view. In one example the digital dispense apparatus 1 is a digital titration cassette. The digital titration cassette may be intended for insertion into a digital titration host apparatus, and for replacement by another cassette after usage. The digital titration cassette may dispense fluids into micro- or multi-well plates or the like that extend below the digital titration cassette during dispensing, for receiving the fluids. In an example, the well plates are to hold separate reagents of similar or different compositions in separate containers. In different examples the wells are to hold several picoliters to several microliters of fluid. Although one example of the digital dispense apparatus is a digital titration cassette that includes digitally actuable fluid dispense devices, the principles described in this disclosure may also apply to other application areas that involve high precision, digitally driven, fluid dispensing.

The illustrated dispense apparatus 1 has a top side 3 and a bottom side 5. Although this disclosure refers to "top" and "bottom", these words should be considered as relative to each other. The dispense apparatus 1 can have any orientation, wherein what is called a top side may in practice extend on a bottom and vice versa. In one example, the top and bottom refer to orientation of the apparatus 1 during dispensing.

The digital dispense apparatus 1 includes at least one monolithic carrier structure 7. The carrier structure 7 is cast as a single piece. Example monolithic carrier structures 7 may include epoxy mold compound, glass, FR4, or any suitable molded plastics or PCB. In the illustrated example, the digital dispense apparatus 1 is of a relatively planar shape, wherein "planar" may refer to a thickness T of at least three times less than a length L or width (the width extending into the page) of the apparatus 1, or at least five times less its length L or width.

The at least one carrier structure 7 carries reservoirs 9 that are to receive fluid. Each reservoir 9 may be to receive fluid from an external source such as a pipette and deliver that fluid to a fluid dispense device 11 downstream of the reservoir 9. The reservoirs 9 may extend at the top side 3 of the carrier structure 7. The reservoirs 9 can be pre-molded cut outs in the carrier structure 7 or separately attached cups that fluidically connect to the fluid dispense devices 11.

The at least one carrier structure 7 carries fluid dispense devices 11 at its bottom side 5. Each fluid dispense device 11 may be provide with an array of drop generators 15 to dispense fluid drops into a well of a well plate. The fluid dispense devices 11 can be embedded in the carrier structure 7 or adhered to it, either directly or indirectly through another carrier structure. In one example the apparatus 1 includes at least one row and at least two columns of fluid dispense devices 11. An example dispense apparatus 1 had more columns than rows in the array of dispense devices 11. A length of a row may extend parallel to the length L of the apparatus 1.

For example, the reservoirs 9 may be partly cup shaped, i.e. open at the top, to receive fluid, and also open at a bottom or side to deliver fluid towards the fluid dispense devices. The reservoir 9 may be wider at the top and narrower at the bottom, for example tapering or curving in the direction of flow. The reservoirs 9 may fluidically connect to fluid feed slots in the fluid dispense devices 11. In one example, additional fluid routing is provided between the reservoirs 9 and fluid dispense devices. In one example, fluid routing is provided to deliver fluid from one reservoir 9 to a plurality of fluid dispense devices 11. The fluid dispense devices 11 may include at least one feed slot and micro channels 13 downstream of the feed slot, for example in a fan out manner, to receive the fluid from the reservoirs 9 and guide the fluid towards nozzle arrays.

Each fluid dispense device 11 may be part of a MEMS die. In one example each one fluid dispense device 11 is formed by one separate die. In another example, a single die includes a plurality of fluid dispense devices 11. The die may include processed silicon and thin film layers. A fluid feed slot may extend through a silicon substrate of the die. Drop generators 15 and micro channels 13 may extend in the thin film layers. In this disclosure, each drop generator 15 may include a nozzle chamber, at least one drop ejection actuators in the nozzle chamber and at least one corresponding nozzle. The nozzle chambers receive fluid from the microchannels. The drop ejection actuators dispense the fluid out of the nozzle chamber through the nozzles. The nozzles extend through a nozzle plate of the fluid dispense device 11. For example, the actuators can be thermal resistors or piezo actuators. Each fluid dispense device 11 includes at least one drop generator array. The drop generators may function similar to drop generators used in thermal inkjet or piezo inkjet printheads. Each fluid dispense device 11 may have any number of drop generators 15, varying from 1 to approximately 1000, for example. Each fluid dispense device 11 may facilitate dispensing a single drop out of a single nozzle at a time, allowing for very low volumes of fluid to be ejected, for example 11 picoliters or less.

The digital dispense apparatus 1 includes an array 17 of contact pads 19. The contact pad array 17 is to interface with electrodes of a host apparatus to allow the host apparatus to control the drop generators 15 of the fluid dispense devices 11. The dispense apparatus 1 further includes electrical routing 21 that connects said contact pad array 17 with the plurality of fluid dispense devices 11. In one example, one contact pad 19 of an array 17 can connect to a plurality of fluid dispense devices 11. Each other contact pad 19 in the array 17 may also connect to a plurality of fluid dispense devices 11. Hence, rather than using a separate contact pad array 17 for each fluid dispense device 11, a single contact pad array 17 can be used to drive a plurality of fluid dispense devices 11.

In operation, at least one contact pad 19 and associated electrical routing 21 may connect to a ground circuit of the host apparatus. The grounded contact pad may be connected to the plurality of fluid dispense devices 11 through associated electrical routing 21. Another one or more contact pads 19 may connect to signaling circuitry of the host apparatus. Each signaling contact pad 19 may also be connected to a plurality of fluid dispense devices 11, through associated electrical routing 21, to signal drop generators 15 of the plurality of fluid dispense devices 11 to dispense fluid. In an example each signaling contact pad may be at least one of a supply voltage (Vdd), data, clock, etc. Also dummy pads may be provided in the contact pad array 17, that do not connect to the fluid dispense devices 11. In certain examples, certain pads may have a different function than facilitating dispensing, for example authentication In an example, one functional contact pad is connected to a plurality of fluid dispense devices 11. Each functional contact pad 19 may be to conduct one of ground signals, supply voltage, data and clock to/from the plurality of fluid dispense devices 11. In this disclosure, a functional contact pad array 17 includes not more than the contact pads 19 that are needed to actuate the fluid dispense device 11 to dispense fluid. One single functional contact pad array 17 wherein each functional contact pad 19 has a separate function can connect to a plurality of fluid dispense devices 11.

In one example, the dispense apparatus 1 is provided with a plurality of reservoirs 9 in a single monolithic carrier structure 7. In another example, the dispense apparatus 1 is provided with a plurality of fluid dispense devices 11 carried by a single monolithic carrier structure 7. In a further example, one or each contact pad 19 of a functional contact pad array 17 is connected to the plurality of fluid dispense devices 11.

Placing arrays of dispense components in a single, planar monolithic carrier structure 7, and allowing them to be triggered via a single functional contact pad array 17, wherein each functional contact pad 19 is connected to the plurality of fluid dispense devices 11, may facilitate (i) denser arrays of fluid dispense devices, for example of more than eight fluid dispense devices 11, (ii) flexibility in fluid dispense device array arrangements, and/or (iii) cost efficient manufacturing of the dispense apparatus 1. This may allow for optimizing digital titration cassettes to well plates of any dimension or type.

Figure 2:
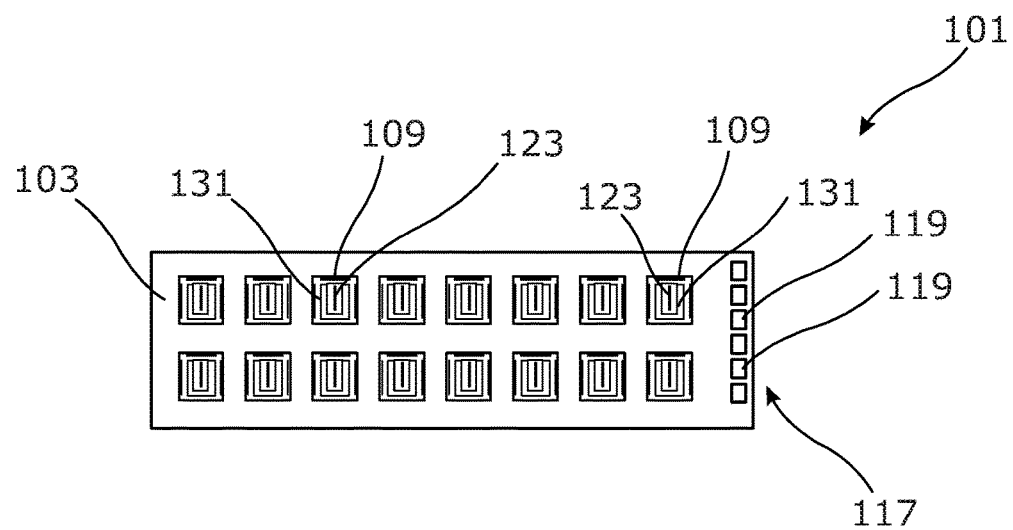
FIG. 2 illustrates a bottom view of another example dispense apparatus.

FIG. 2 illustrates a diagram of an example of a digital dispense apparatus 101 that includes a monolithic carrier structure 103 and two rows of fluid dispense dies 131. Each die 131 provides for a separate fluid dispense device 111. The fluid dispense dies 131 have nozzle arrays 123, each nozzle being part of a drop generator. In different examples, the plurality of fluid dispense dies 131 can be adhered to the carrier structure 103, directly overmolded in the carrier structure 103, or adhered to a single PCB (printed circuit board) that is subsequently overmolded in the carrier structure 103. In an example, the plurality of fluid dispense dies 131 is adhered to a single PCB without subsequently overmolding wherein the PCB is the carrier structure 103.

The digital titration cassette 101 includes a single functional contact pad array 117. Each single functional contact pad 119 may be electrically connected to the plurality of fluid dispense dies 131. Each singular functional contact pad 119 may be connected to the plurality of dies 131 through electrical routing that extends in or along the monolithic carrier structure 103. For example, the electrical routing can be formed using MID (molded interconnect device) and/or LDS (laser direct structuring) technology. For example, all fluid dispense dies 131 in the apparatus 101 are connected to the same functional contact pads 119 of the contact pad array 117.

Figure 3A:
FIG. 3A-3C illustrate a diagrams of an example digital titration cassette in a front view, bottom view and top view, respectively.
Figure 3B:
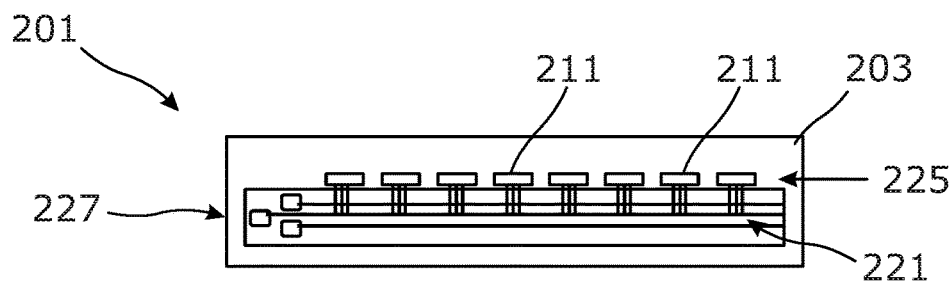
Figure 3C:
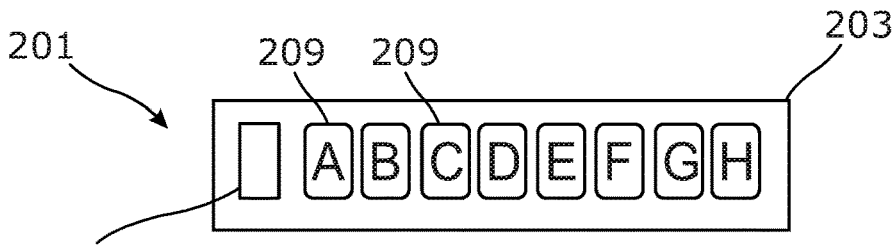

FIGS. 3A-3C illustrates a diagram of another example digital titration cassette 201 in a front view, bottom view and top view, respectively. The digital titration cassette 201 is generally planar as illustrated by FIG. 3A. The digital titration cassette 201 includes at least one rigid, monolithic carrier structure 203 that carries reservoirs 209, fluid dispense devices 211, electric routing 221, contact pad arrays 217, etc.

FIG. 3B illustrates a bottom view of the example cassette 201. The cassette 201 includes an array 225 of fluid dispense devices 211. Each fluid dispense device 211 may be formed of a discrete, thin sliver, fluid dispense die that includes drop generator circuitry provided in thin film layers. In this disclosure a thin sliver die may include a silicon substrate with at least one thin film layer on top, wherein the die is to be provided with additional support to obtain structural stability. The monolithic carrier structure may provide such structural support. In different examples a thin sliver die has a thickness (extending into the page of the drawing) of less than approximately 500 micron, for example less than approximately 300 micron, for example less than approximately 200 micron or for example less than approximately 150 micron. In one example, the rigid monolithic carrier structure 203 may provide for mechanical support to the thin die.

Electrical routing 221 may electrically connect the fluid dispense devices 211 to the contact pad array 217. In the illustrated example, most of the electrical routing 221 is disposed on a surface of the rigid monolithic carrier structure 203, for example on the bottom surface. In different examples, the electrical routing 221 can be disposed using MID technology, LDS technology and/or flexible circuitry adhered to or embedded in the carrier structure 203. In another example the electrical routing 221 is provided on a separate PCB (printed circuit board) adhered to or embedded in the carrier structure 203. Part of the electrical routing 221 may extend through the carrier structure 203. To that end, the electrical routing 221 may include bond pads, vias or contact points 227 that connect the fluid dispense devices 211 on the bottom surface to the contact pad array 217 on the top surface. Suitable techniques such as soldering and/or wire bonding may be applied between the contact points or vias 227 and the rest of the electrical routing 221. Similarly soldering or wire bonding may be applied to connect the electrical routing 221 to the fluid devices 211 and the contact pad array 217.

FIG. 3C illustrates a top side of the example cassette 201. A contact pad array 217 that includes multiple contact pads can be provided on the top side, to interface with host apparatus circuitry. In one example singular contact pads within the contact pad array 217 are connected to a plurality of fluid dispense devices 211.

The top side of the cassette 201 further includes an array of reservoirs 209. In an example the reservoirs 209 are an integral part of the monolithic carrier structure 203. For example, the reservoirs 209 are directly molded or cut out as openings in the carrier structure 203. Each reservoir 209 may fluidically connect to a different fluid dispense device 211, for example to be able to hold and dispense different fluids, as indicated by symbols A-H. In an example, each reservoir 209 is shaped to hold approximately 100 microliter or less, approximately 50 microliter or less or approximately 20 microliter or less, in an operational position in the host apparatus.

Figure 4:
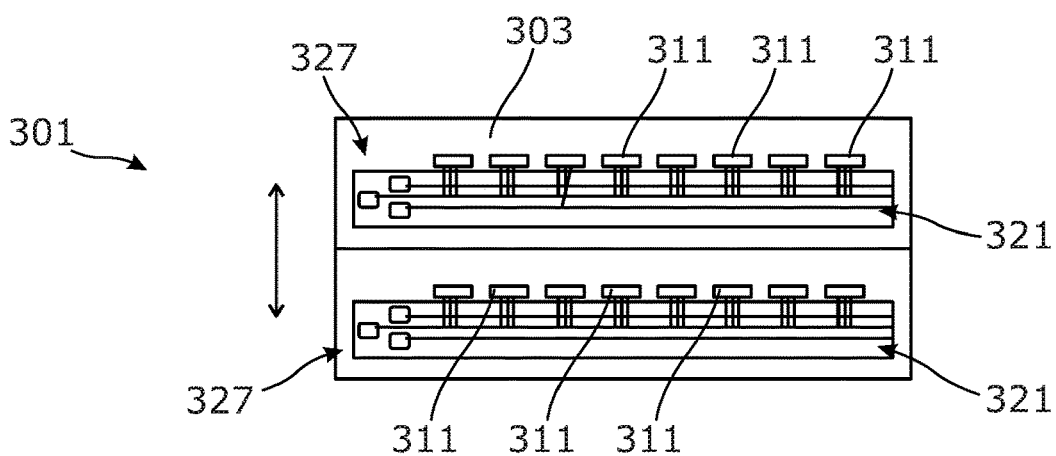
FIG. 4 illustrates an example of a monolithic carrier structure including fluid dispense devices and electrical routing.

FIG. 4 illustrates another example of a digital titration cassette 301 including a monolithic carrier structure 303, fluid dispense devices 311 and electrical routing 321. The cassette 301 may have similar features as explained above with FIGS. 3A-3C. The cassette 301 of FIG. 4 has a plurality of rows and a plurality of columns of fluid dispense devices 311. In the illustration, the cassette 301 has two rows and eight columns of fluid dispense devices 311. Furthermore, the cassette 301 may have two separate electrical routing assemblies 321 wherein each routing assembly 321 includes bond pads, contact points and/or vias 327 to connect the electrical routing to corresponding contact pad arrays and fluid dispense dies. Routing and contact technologies may be similar as addressed previously for FIGS. 3A-3C, for example including flex circuitry, PCB circuitry, LDS, MID, etc. Each electrical routing assembly 321 may connect to a corresponding contact pad array, so that one contact pad array may be provided per row.

Figure 5:
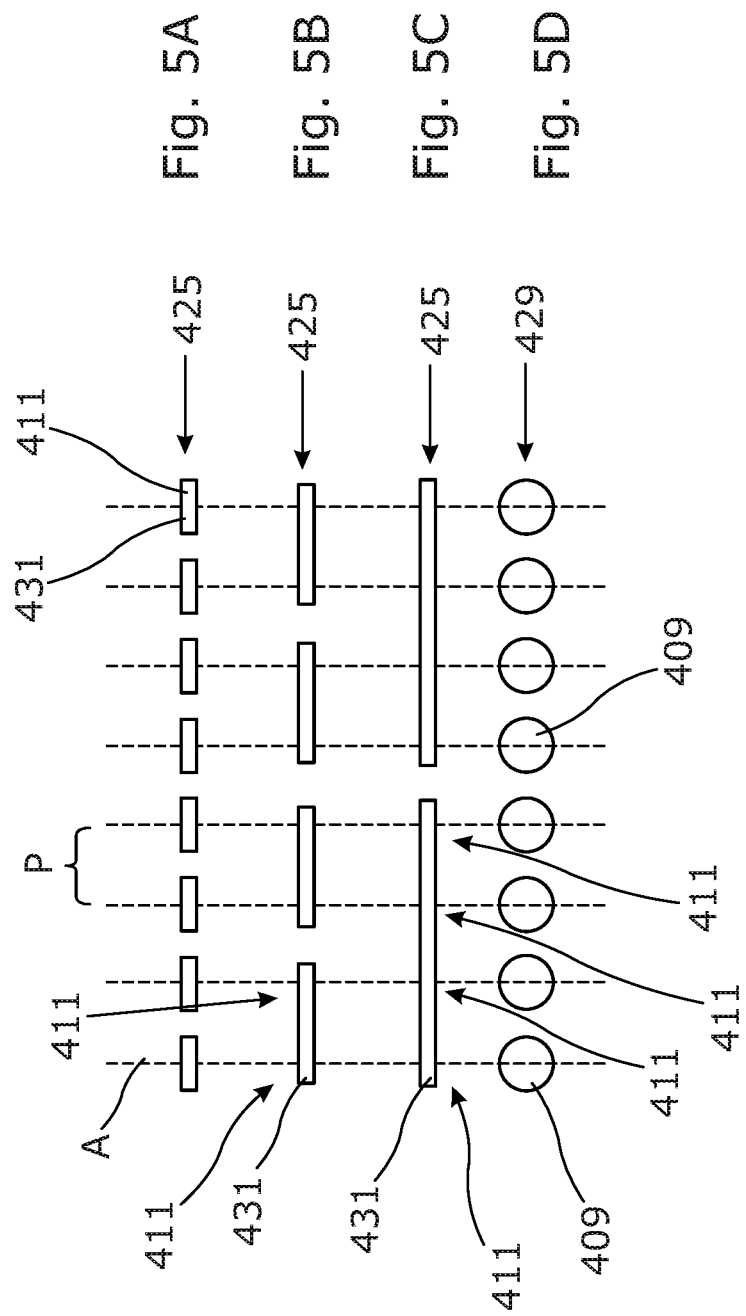
FIG. 5A-5C illustrate diagrammatic examples of different fluid dispense die arrays.
FIG. 5D illustrates a corresponding reservoir array.

FIGS. 5A-5C illustrate different examples of fluid dispense device arrays 425 and FIG. 5D illustrates an example of a corresponding reservoir array 429 that delivers fluid to the fluid dispense device arrays 425. As indicated with dotted axes in FIGS. 5A-5D, the fluid dispense devices 411 in each fluid dispense array 425 are provided at the same pitch P as reservoirs 409 in each reservoir array 429. In one example the pitch P is approximately 9 millimeters. In other examples, the pitch P can be a multitude of 0.5 or 0.75 millimeters. The pitch P of each fluid dispense device can be chosen based on a well pitch of a well plate.

Each example fluid dispense array 425 in FIGS. 5A-5C has the same amount of fluid dispense devices 411. Each example fluid dispense array 425 in FIGS. 5A-5C has a different amount of fluid dispense dies 431. FIG. 5A illustrates an example wherein each fluid dispense device 411 is formed by a separate, single die 431. FIG. 5B illustrates an example wherein a single die 431 includes two fluid dispense devices 411. FIG. 5C illustrates an example wherein each single die 431 includes four fluid dispense devices 411. Each die 431 of FIGS. 5B and 5C is fluidically connected to multiple reservoirs 409 so that different fluids can be dispensed from a single die into different corresponding wells. In other examples, different numbers of fluid dispense devices 411 can be included in a single die 431.

In FIGS. 5A-C, each fluid dispense die 431 has a thickness, width and length wherein the thickness extends into the page, the width extends parallel to the pitch axes A, and the length extends perpendicular to the pitch axes A. The fluid dispense die 431 can be a thin sliver die, for example having a thickness of approximately 0.9 millimeters or less, approximately 0.5 millimeters or less, 300 micron or less, 200 micron or less or 150 micron or less. The width of each die 431 can be approximately 1 millimeter or less, 0.5 millimeters or less, for example approximately 0.3 millimeters or less. The length of each die 431 may depend on the pitch P and the chosen number of fluid dispense devices 411 that the die 431 incorporates. Where the pitch P is 9 millimeters, the length of each die 431 of FIG. 5A is approximately 1.5 millimeters, the length of each die 431 of FIG. 5B is approximately 10 millimeters, and the length of each die 431 of FIG. 5C is approximately 30 millimeters. For example the length of the die can be captured in a formula such as $Ls=(n*P)+m$, wherein Ls is the die length, n is the chosen number of fluid dispense devices that the die incorporates, P is the fluid dispense device pitch (that may be based on a well plate well pitch), and m may be depend on a chosen length of each fluid dispense device. For example, m can be between 0.2 and 3 millimeters. In turn the chosen length m of the fluid dispense device can depend on the desired length of a nozzle array.

As said, a plurality of fluid dispense devices 411 can be included in one die 431. A fluid dispense device is defined by being configured to dispense fluid in a separate well. The contact pad array 417 and electrical routing 421 can be configured to drive each fluid dispense device 411 separately on the same die 431. In one example, a nozzle plate includes regions with nozzle arrays spaced by regions with without nozzles, wherein the nozzle array regions define the fluid dispense devices 411 in the die 431. In another example a nozzle array may extend uninterruptedly over the length of the die, wherein the electrical routing, software and/or firmware may be configured to activate separate nozzle groups within the larger array for dispensing into separate wells, wherein each nozzle group may define a separate fluid dispense device 411. In other examples, dummy nozzles may be provided between zones of active nozzles wherein active nozzle regions define the fluid dispense devices.

Figure 6:
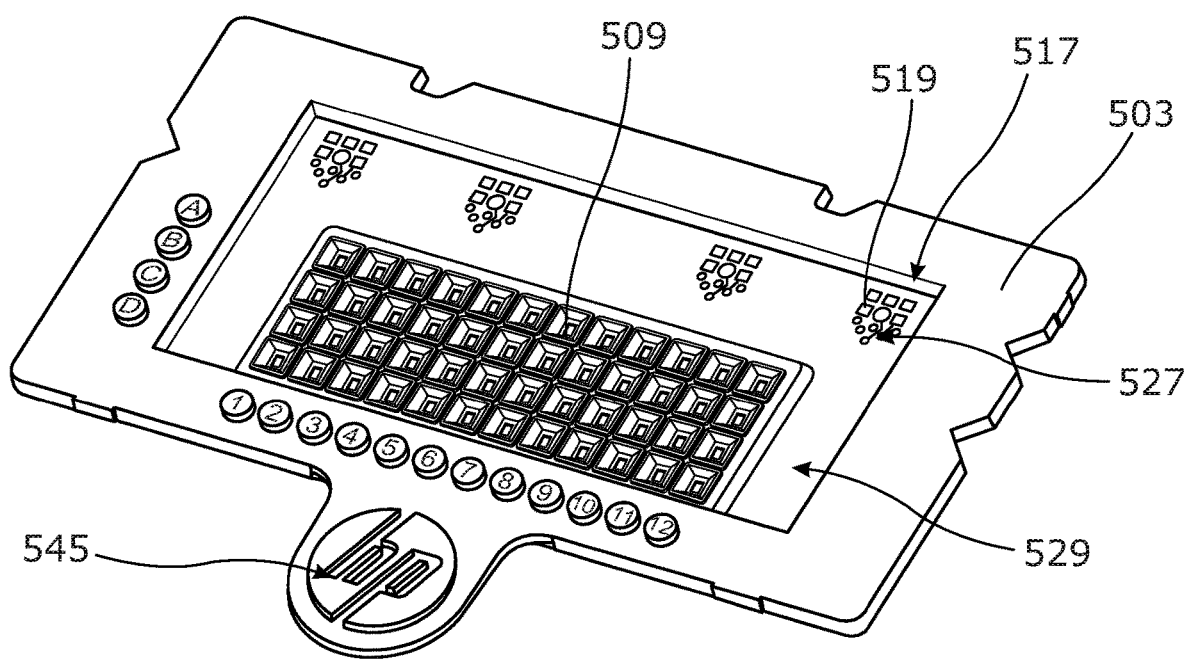
FIG. 6 illustrates an example of a monolithic carrier structure including contact pad arrays and a large array of reservoirs, in a perspective view onto a top side of the structure.
Figure 7:
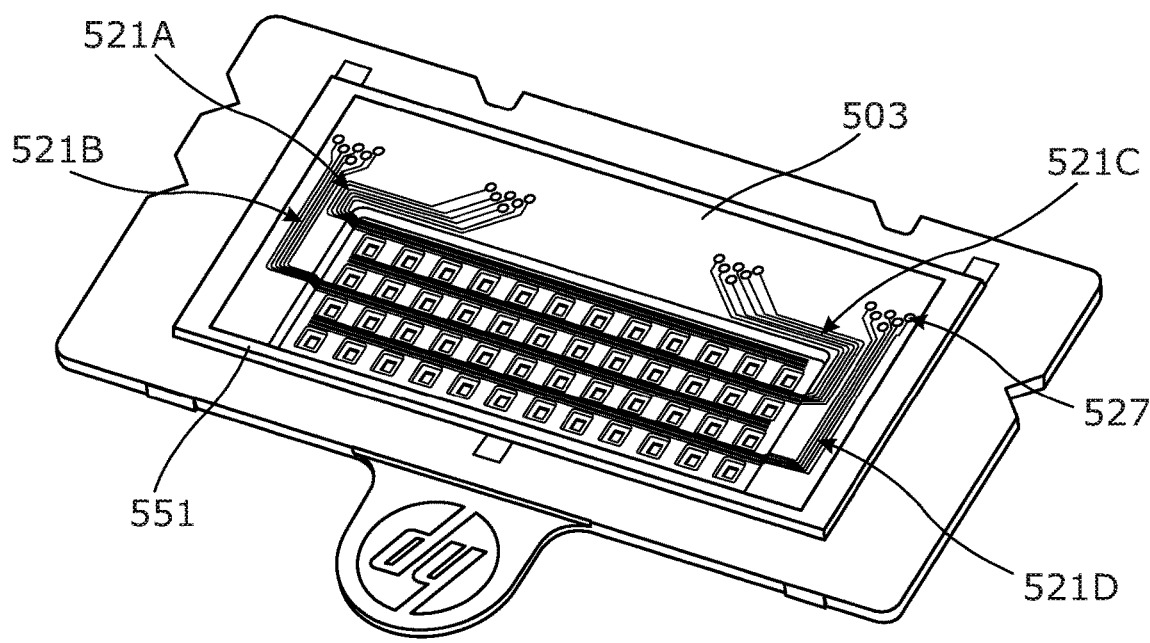
FIG. 7 illustrates the example monolithic carrier structure of FIG. 6 in a perspective view on a bottom side.
Figure 8:
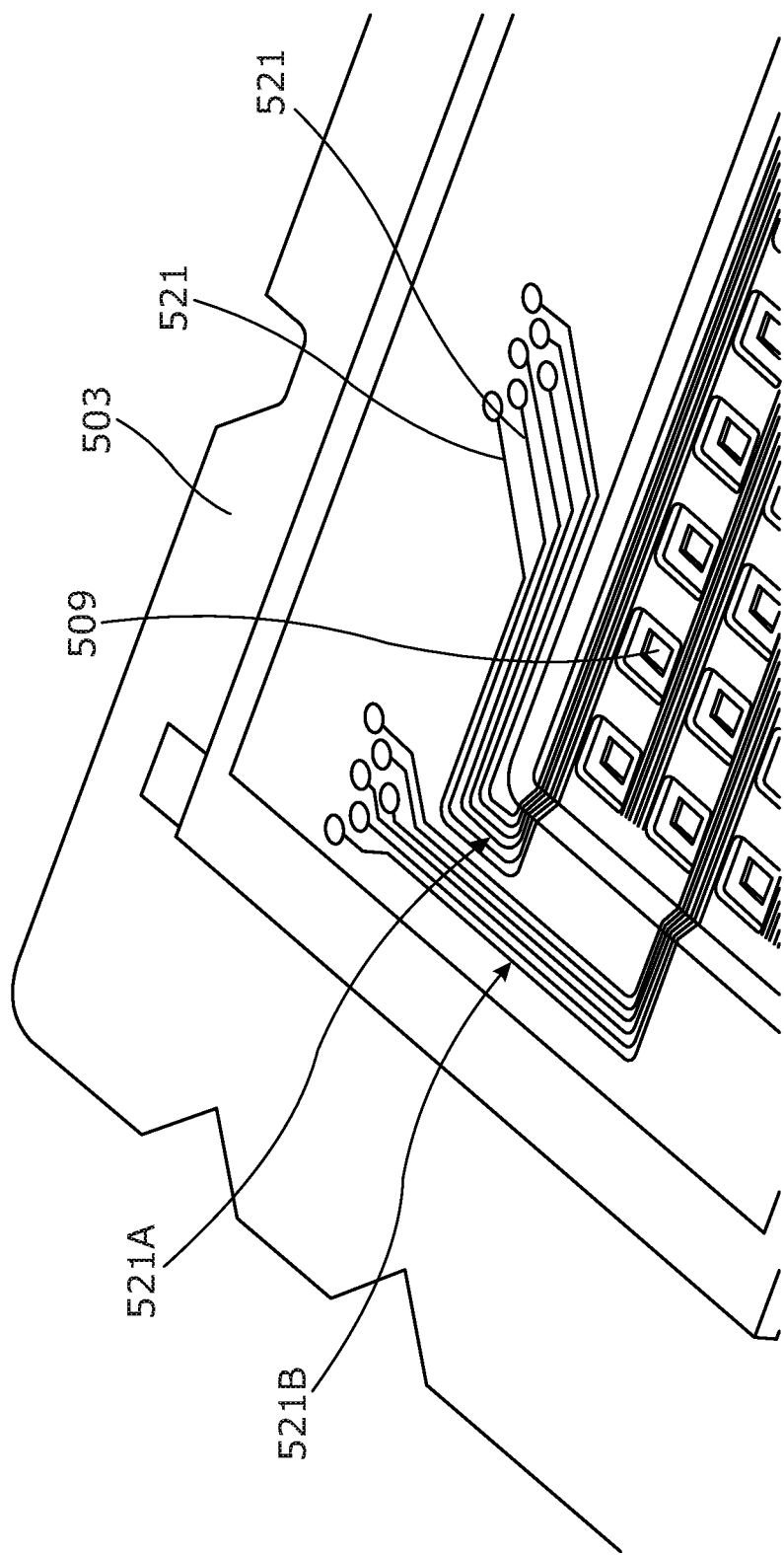
FIG. 8 illustrates a detail of the example monolithic carrier structure of FIGS. 6 and 7, in an enlarged, perspective view on a portion of the bottom side.

FIGS. 6-8 illustrate an example of a monolithic carrier structure 503 in perspective views. The monolithic carrier structure 503 includes a relatively dense reservoir array 529. The illustrated monolithic carrier structure 503 may be an intermediate product without fluid dispense device array. The fluid dispense device array can be manufactured and connected separately. FIG. 6 illustrates a top side of the monolithic carrier structure 503 while FIGS. 7 and 8 illustrate a bottom side of the carrier structure 503.

In the illustrated example, the carrier structure 503 includes a grip 545 that may extend in the main plane of the carrier structure 503, protruding from an edge of the structure 503. The grip is integrally molded in the carrier structure 203.

In the illustrated example, the reservoirs 509 are integrally molded in the carrier structure 503 in multiple rows and columns. For example, the reservoirs 509 are directly defined by surfaces of the monolithic carrier structure 503 so that when filled the carrier structure 503 is in direct contact with the fluid to receive the fluid from an external source and guide the fluid to the fluid dispense devices. In the illustrated example, the rows are labeled A-D and the columns are labeled 1-12. In the illustrated example, forty-eight reservoirs 509 are pre-molded in the carrier structure 503. In other examples, less reservoirs 509 or more reservoirs 509 can be incorporated in the carrier structure 503, for example also in a matrix arrangement.

The carrier structure 503 may carry at least one contact pad array 517 to connect to the plurality of fluid dispense devices. As illustrated by FIG. 6, the carrier structure 503 can include a plurality of discrete contact pad arrays 517 such as four discrete contact pad arrays 517, distanced from each other, wherein single functional contact pads 519 within each array 517 are to be connected to a plurality of fluid dispense devices. One fluid dispense device can be positioned under each reservoir 509. Hence, in the illustrate example each discrete contact pad array 517 connects to one row A-D of fluid dispense devices.

The contact vias 527 route through the carrier structure 503, from the top side to the bottom side, using appropriate via techniques such as mentioned earlier. As illustrated in FIGS. 7 and 8, separate electrical routing groups 521A-521D are provided on the bottom, wherein each separate electrical routing group 521A-521D connects to a discrete contact pad array 517 on the top side. At the opposite end of the routing with respect to the contact pad arrays 517, each electrical routing group 521A-521D is to connect to one row A-D of fluid dispense devices, for example by wire bonding each routing 521 to the appropriate die. In the illustrated example each electrical wire within each group 521A-521D ends near a reservoir 509 from where it will connect to a corresponding fluid dispense device. Again, electrical routing 521A-521D can be applied to the carrier structure 503 using MID and/or LDS technology In one example, a second monolithic carrier structure such as a PCB that carries the fluid dispense devices can be readily bonded to the bottom of the illustrated monolithic carrier structure 503. The fluid dispense dies can be molded in or adhered to the second carrier structure. For example, such second monolithic carrier structure can be placed in a rectangular pre-molded cut out 551 in the bottom of the carrier structure 503. For example, bond pads of such second monolithic carrier structure can be connected to end points of the electrical routing 521A-521D. In different examples, the first monolithic carrier structure 503 can be made of FR4, glass, molded plastics, etc. The second monolithic carrier structure can for example be made of FR4, glass, molded plastics, PCB board material, etc.

Figure 9:
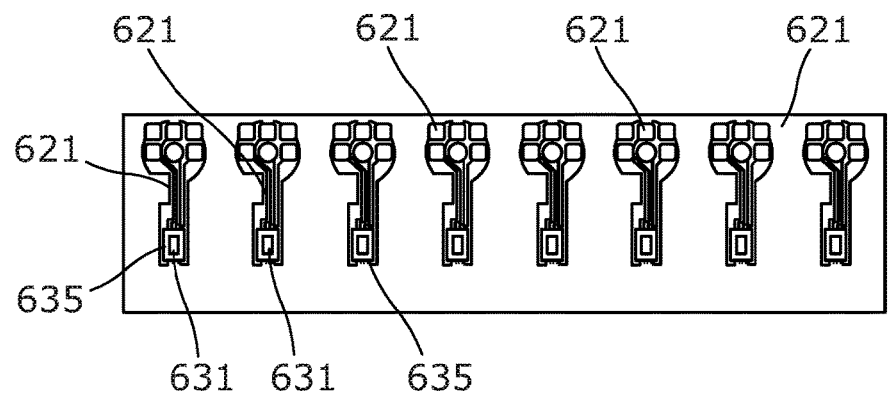
FIG. 9 illustrates an example of a monolithic carrier structure in top view including a row of fluid dispense devices, electrical routing and contact pad arrays.

FIG. 9 illustrates a top view of an example of an assembly of a monolithic carrier structure 603 with fluid dispense dies 631 attached to it. The illustrated example monolithic carrier structure 603 includes eight through holes 635. A single row of eight fluid dispense dies 631 is attached in or over the holes 635, to the monolithic carrier structure 603. In the illustrated example, top sides of the fluid dispense die 631 are visible through the holes 635.

The carrier structure 603 may be a PCB. Contact pad arrays 19 and electrical routing 621 are provided on the carrier structure 603. For example, printed circuit layers of the PCB are used to form the electrical routing 621. The fluid dispense dies 631 are attached to the PCB and to the electrical routing 621. For example such attaching is performed using (i) screen printed solder paste, (ii) needle or jet dispensing adhesive, (iii) stamp transferring adhesive or (iv) die attach film. Bond pads of the fluid dispense die 631 can be wire bonded to the routing 621 or the fluid dispense die 631 can be attached through heated screen printed solder paste for electrical connection. In the illustrated example, each routing group 621 of each die 631 connects to a separate contact pads array 617. A row of eight discrete contact pad arrays 617 extends along the row of fluid dispense dies 631, for connection to host apparatus electrodes to drive the fluid dispense dies 631.

Figure 10:
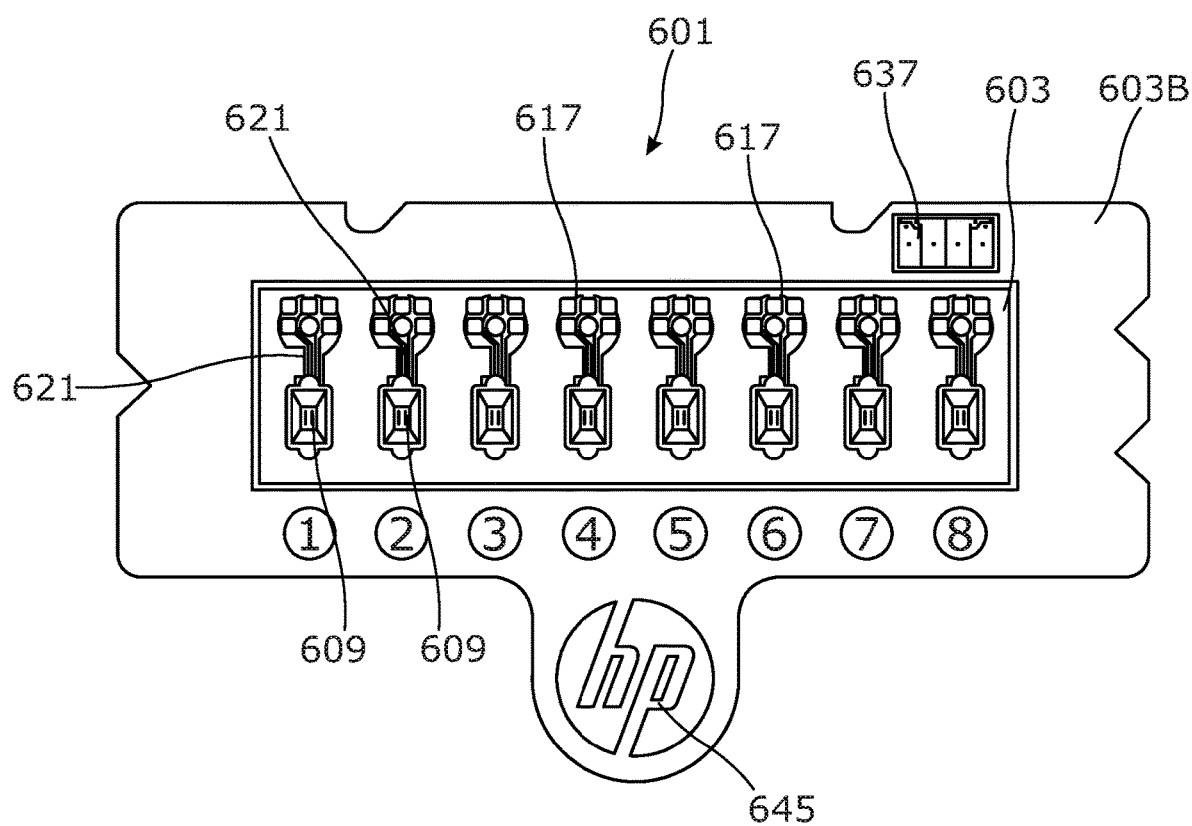
FIG. 10 illustrates an example of a digital titration cassette in top view, including the monolithic carrier structure of FIG. 9 and a row of reservoirs.

FIG. 10 illustrates a digital titration cassette 601 including the assembly of FIG. 9. The assembly of FIG. 9 is assembled to a second monolithic carrier, in this example referred to as a support frame 603B. The support frame 603B may serve to slide into a host digital titration apparatus so as to be held in position. The support frame 603B may include a grip 645 to facilitate gripping and manual placement in the host apparatus. The first monolithic carrier structure 603 may be adhered to the frame 603B. The frame 603B may further support a memory device 637. For example, the memory device 637 may include product identification data, authentication data, etc. The memory device 637 may be at least one of a read-only memory, a read-write memory, a microcontroller, integrated circuitry, etc.

In the illustrated example, discrete reservoir cups 609 are adhered to the single PCB assembly on top of the through holes 635, to deliver fluids to each fluid dispense die. In another example a single monolithic reservoir cup array that contains molded reservoirs may be adhered over the PCB assembly.

Figure 11:
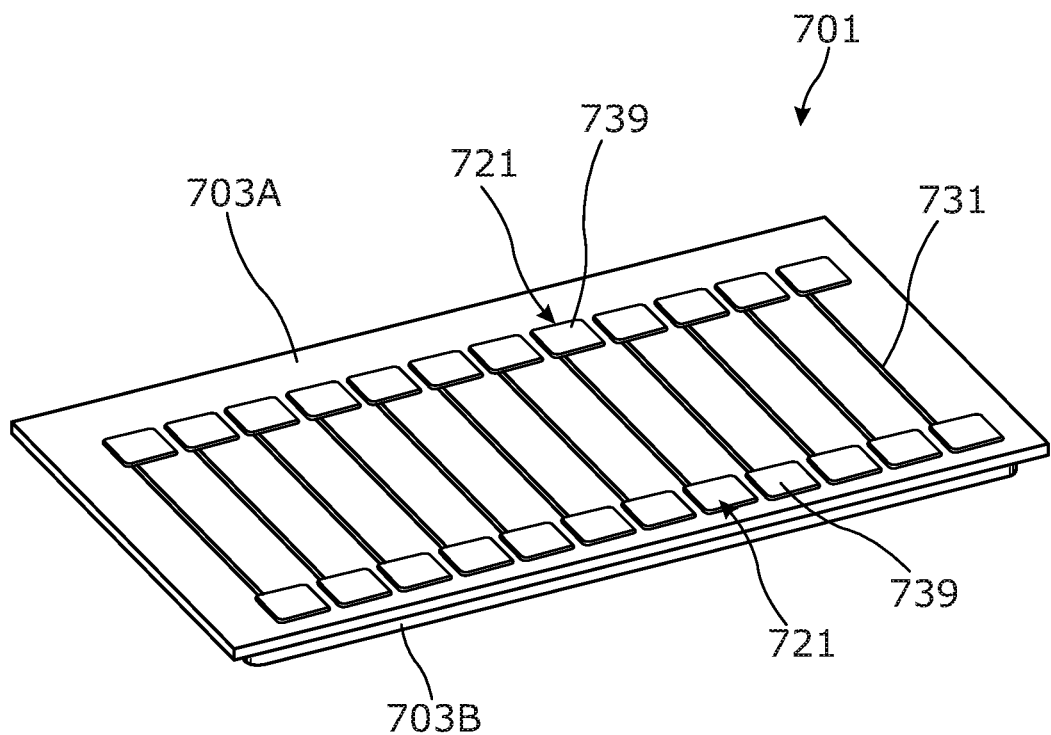
FIG. 11 illustrates a perspective view onto a bottom side of an example of a digital titration cassette.

FIG. 11 illustrates an example of a digital titration cassette 701, including first monolithic carrier structure 703A having embedded therein a plurality of thin sliver fluid dispensing dies 731, in such a manner that at least its nozzles are exposed. The dies 731 may be overmolded into the first molded carrier structure 703A, for example by compression molding. For example, electrical routing 721 may electrically connect to ends of the dies 731. The electrical routing 721 may be encapsulated by encapsulation material 739. The electrical routing 721 may extend through the first monolithic carrier structure 703A to a top side of the first monolithic carrier structure 703A. Electrical traces may extend through the monolithic carrier structure 703A for example in the form of TMV (through mold vias) to route electrical wiring to the dies 731. The dies 731 may be wirebonded to the electrical routing 721. Electrical routing 721 may be provided on a second monolithic carrier structure 703B on a top side of the first monolithic carrier structure 703A.

Figure 12:
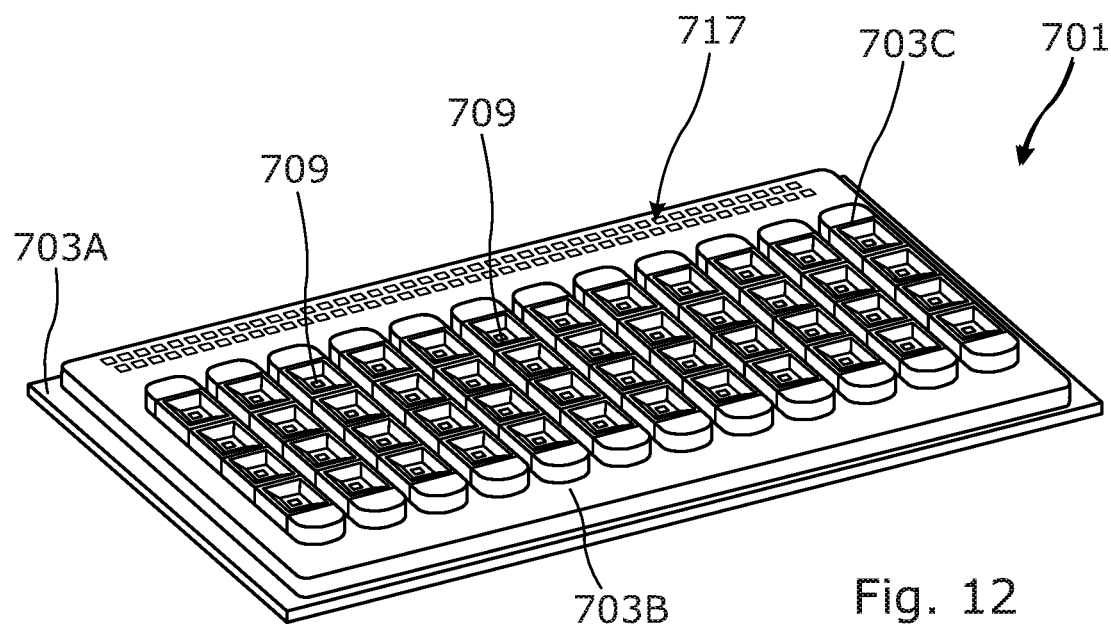
FIG. 12 illustrates a perspective view onto a top side of the example digital titration cassette of FIG. 11.

FIG. 12 illustrates a the digital titration cassette 701 of FIG. 11 on a top side, with a view on a second monolithic carrier structure 703B on top of the first monolithic carrier structure 703A and a third monolithic carrier structure 703C on top of the second monolithic carrier structure 703C. The second monolithic carrier structure 703B may be a PCB assembly. The second monolithic carrier structure 703B may be assembled to the top of the first monolithic carrier structure 703A, for example using adhesive such as PSA (pressure sensitive adhesive). The second monolithic carrier structure 703B includes electrical routing connected to TMVs or bond pads of the first monolithic carrier structure 703A, to connect to the fluid dispense dies 731. The second monolithic carrier structure 703C further includes at least one contact pad array 717 for interfacing with a host apparatus. The at least one contact pad array 717 may extend along an edge of the second monolithic carrier structure 703B, for example between the edge and a reservoir array.

The third monolithic carrier structure 703C may be a molded, relatively rigid array of cups that form reservoirs 709 for delivering fluid to each of the fluid dispense dies 731. As illustrated by the combination of FIGS. 11 and 12, a length of a single die 731 can span a column of multiple cup-shaped reservoirs 709. For example the die 731 includes a plurality of fluid dispense devices wherein each device fluidically connects to a separate reservoir 709, so that one die 731 can dispense different fluids into different corresponding wells. Similar structures were explained with reference to FIGS. 5A-5D. The pitch of the reservoirs 709 may be the same as the pitch of the intra-die fluid dispense devices.

Figure 13:
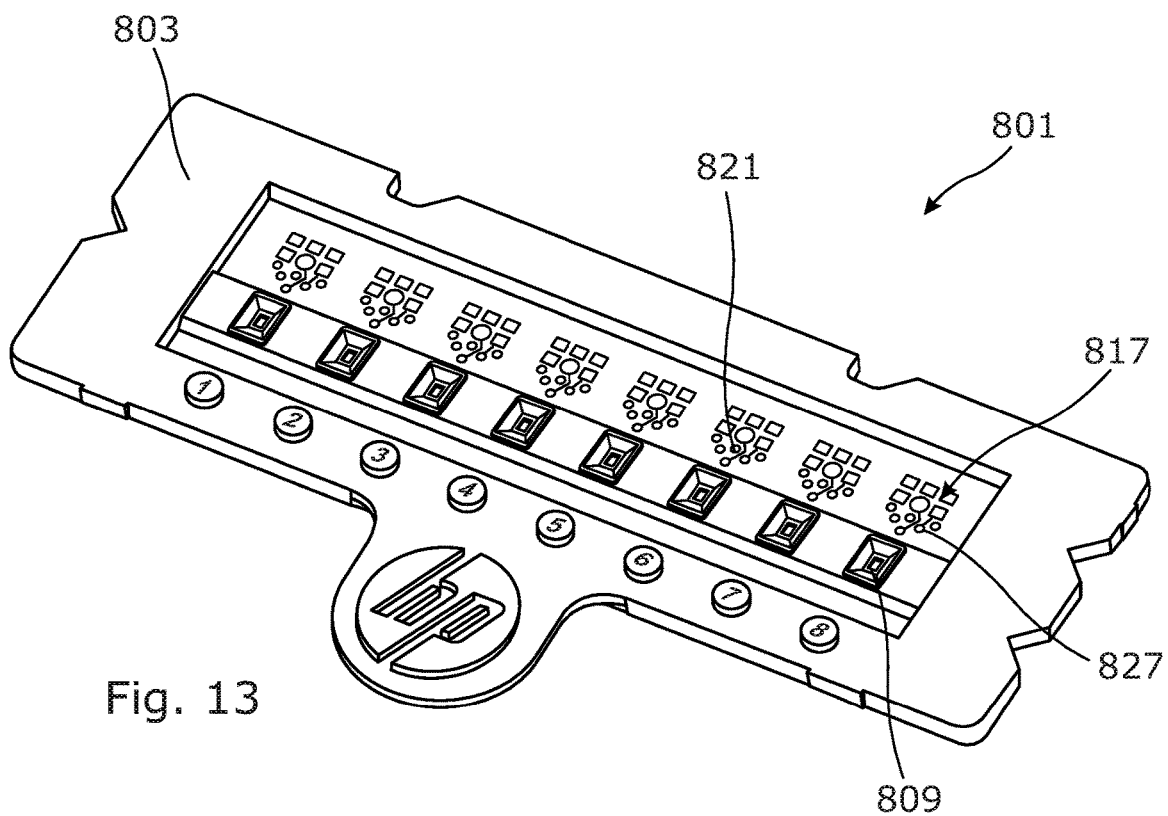
FIG. 13 illustrates a perspective view onto a top side of an example of a digital titration cassette.
Figure 14:
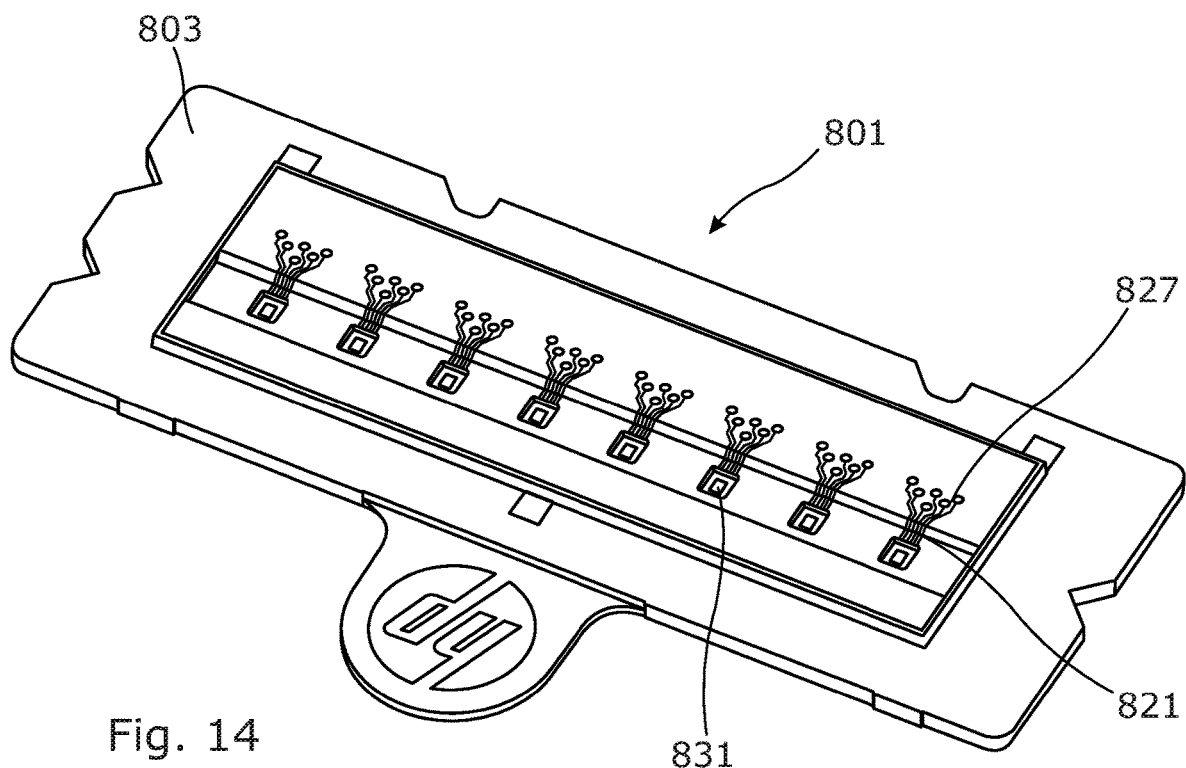
FIG. 14 illustrates a perspective view onto a bottom side of the example digital titration cassette of FIG. 13.

FIGS. 13 and 14 illustrate an example of a digital titration cassette 801 having only one monolithic carrier structure 803. FIG. 13 illustrates a perspective view on a top side and FIG. 14 a perspective view on a bottom side. As illustrated in FIG. 13, the monolithic carrier structure 803 includes an array of pre-molded reservoirs 809. The illustrated carrier structure 803 includes one row of reservoirs 809. Discrete contact pad arrays 817 are provided along the row of reservoirs 809. Electrical routing 821 is provided on the top side, between electrical routing 821 and electrical vias 827, such as TMVs. The electrical routing 821 can be formed by MID, for example by directly plating wires onto the carrier structure 803. The electrical vias 827 extend through the carrier structure 803 to the bottom side, to connect to fluid dispense dies 831. As illustrated in the view on the bottom in FIG. 14, further electrical routing 821 may extend from each via 827 to each fluid dispense die 801, for example again using TMV and/or MID technologies.

The fluid dispense dies 831 may be embedded in the carrier structure 803, in the bottom portion. The dies 831 may be thin sliver dies. In one example the dies 831 are overmolded using compression molding techniques. At least one fluid slot in the top of the die 831 may fluidically connect to the reservoir 809. For example wire bonding can be applied to connect the dies 831 to the routing 821 at the bottom side.

Figure 15:
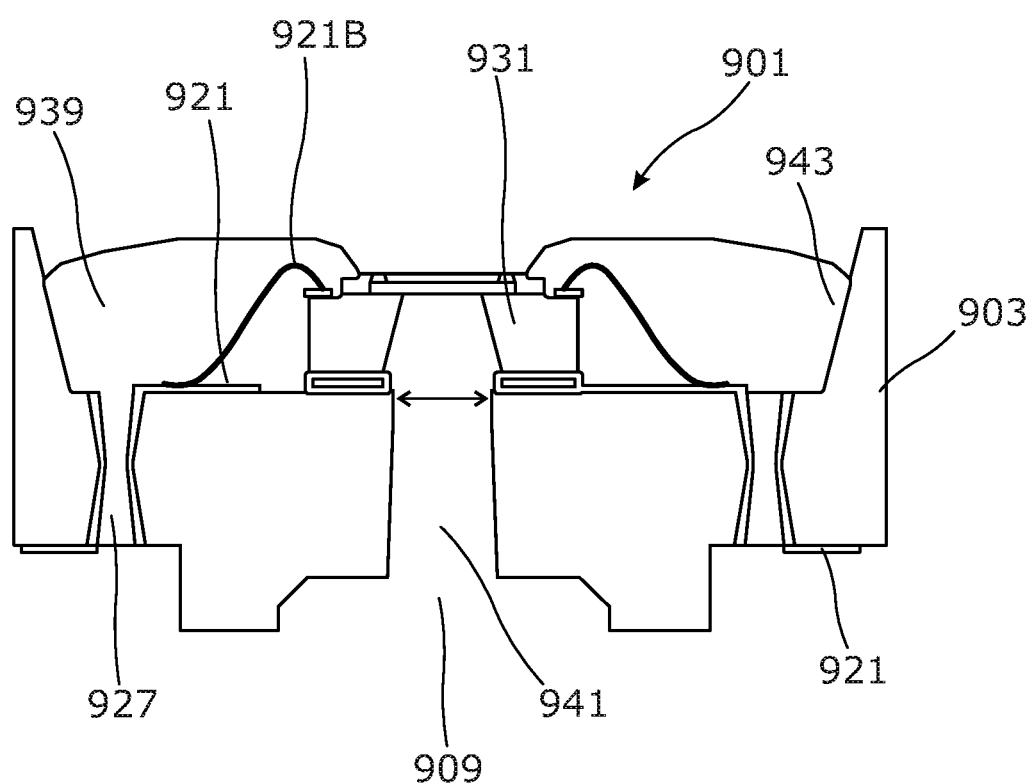
FIG. 15 illustrates another example of a dispense assembly in a cross sectional side view.

FIG. 15 illustrates a cross section of a digital titration cassette 901 having a single molded monolithic carrier structure 903. The cassette 901 is illustrated bottom up. A reservoir 909 is integrally molded in the carrier structure 903, opening into a molded fluidic passage 941. The carrier structure 903 may include molded pockets 943 in the bottom side to receive and adhere fluid dispense dies 931. Stamp transferring adhesive may be used to adhere the die 931 to the bottom surface, for example in the pocket 943. TMVs 927 may be formed in the carrier structure 903 that connect to electrical routing 921 on both sides of the carrier structure 903. The die 931 may be wire bonded to the electrical routing 921. The wire bond wires 921B and/or TMVs 927 may be encapsulating using encapsulation material 939, such as adhesive, epoxy-based compound, etc. The encapsulation material 939 may extend in the pocket 943, between the die 931 and pocket walls.

Figure 16:
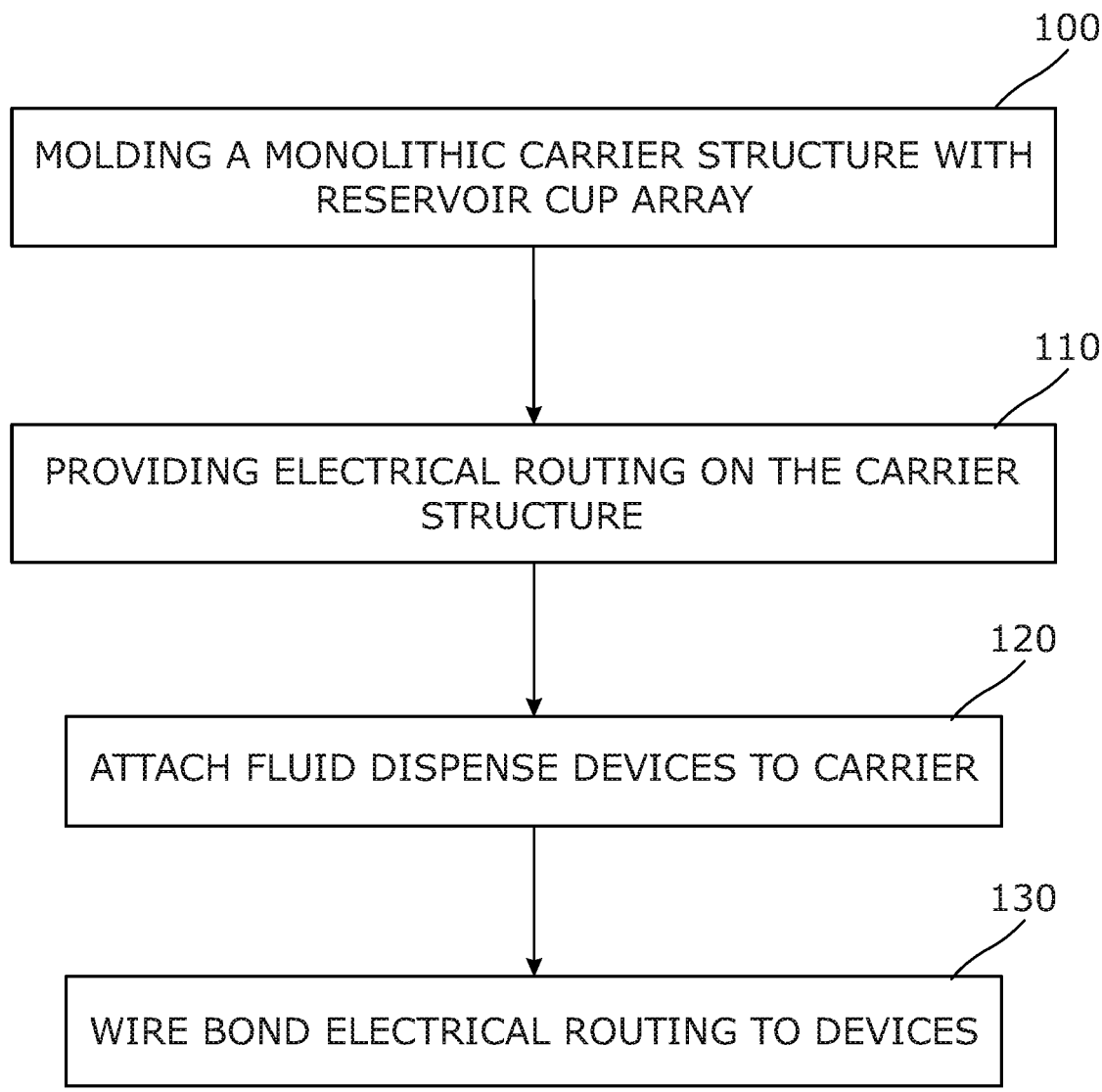
FIG. 16 illustrates an example of a method of manufacturing a digital titration cassette.

FIG. 16 illustrates a method of manufacturing a digital titration cassette. The method includes molding a monolithic carrier structure having a reservoir array (block 100). In an example the carrier structure is planar and the reservoirs are holes through the planar carrier structure, for example having tapered or curved portions to receive and guide fluid. The method further includes providing electrical routing on the carrier structure (block 110). In different examples, the electrical routing can be provided using MID and/or LDS techniques, as well as by creating through hole vias such as TMVs. The method further includes attaching fluid dispense devices to the monolithic carrier structure (block 120). The fluid dispense devices may include or be part of fluid dispense dies that are fluidically connected to the reservoirs. Different adhesion techniques may include (i) screen printed solder paste, (ii) needle or jet dispensing adhesive, (iii) stamp transferring adhesive or (iv) die attach film, to facilitate attaching the dies to the carrier structure. The electrical routing is electrically bonded to the dies, for example through wire bonding (block 130).

Figure 17:
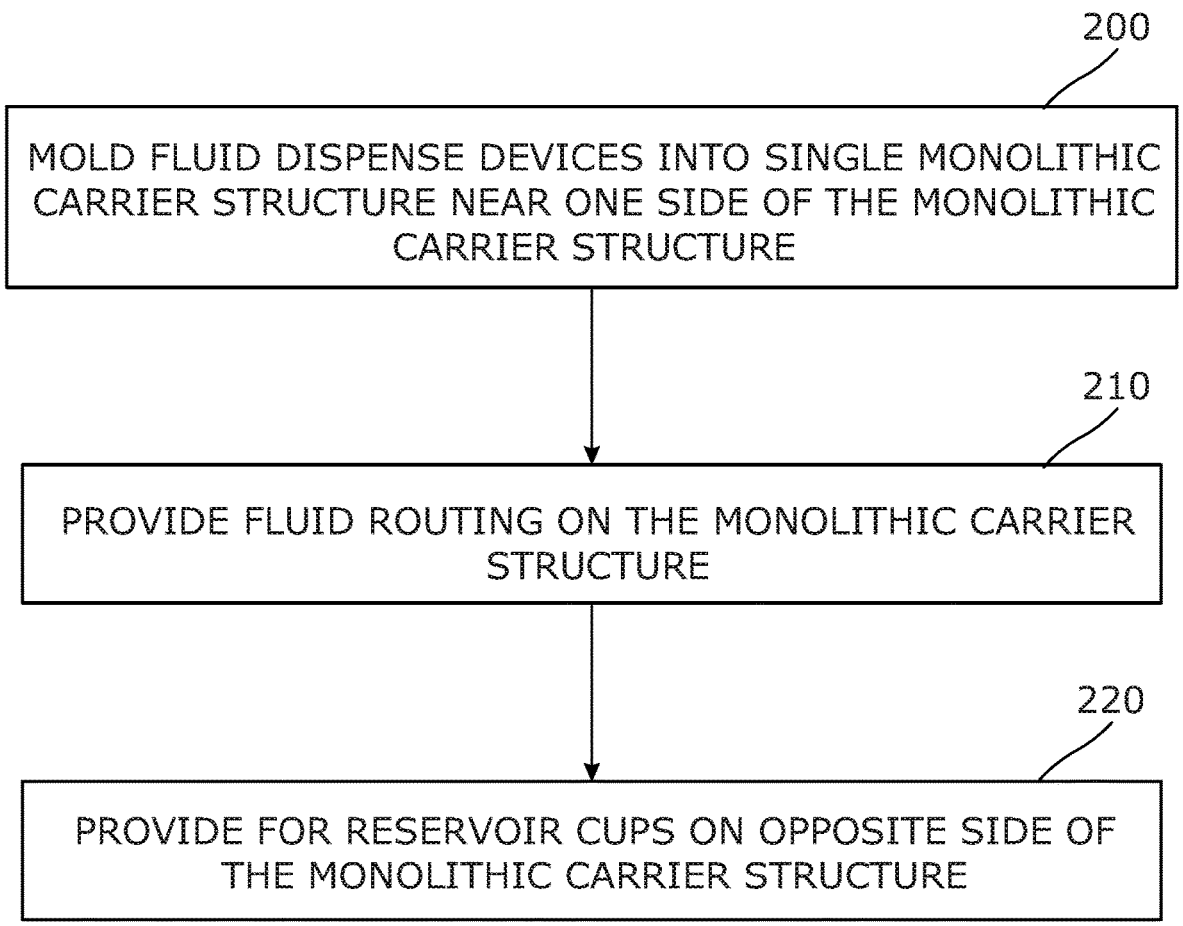
FIG. 17 illustrates another example of a method of manufacturing a digital titration cassette.

FIG. 17 illustrates another example of a method of manufacturing a digital titration cassette. The method includes molding an array of fluid dispense devices into a single monolithic carrier structure near one side of the monolithic carrier structure (block 200). In one example the fluid dispense devices are thin sliver fluid dispense dies and the dies are compression molded in a plastic compound such as epoxy mold compound. The method further includes providing a fluid passage in the monolithic carrier structure (block 210). For example an array of through holes is molded in the carrier structure that connects to the die, or cut outs serving as fluid routing are molded in the carrier structure. The method further includes providing an array of reservoirs on the opposite side of the monolithic carrier structure (block 220). In one example at least one reservoir is molded into the side of the monolithic carrier structure that is opposite to the side of the fluid dispense dies, so as to connect to the earlier mentioned fluid passage or fluid routing. In another example at least one reservoir cup is adhered to the side of the monolithic carrier structure that is opposite to the side of the fluid dispense dies.

Figure 18:
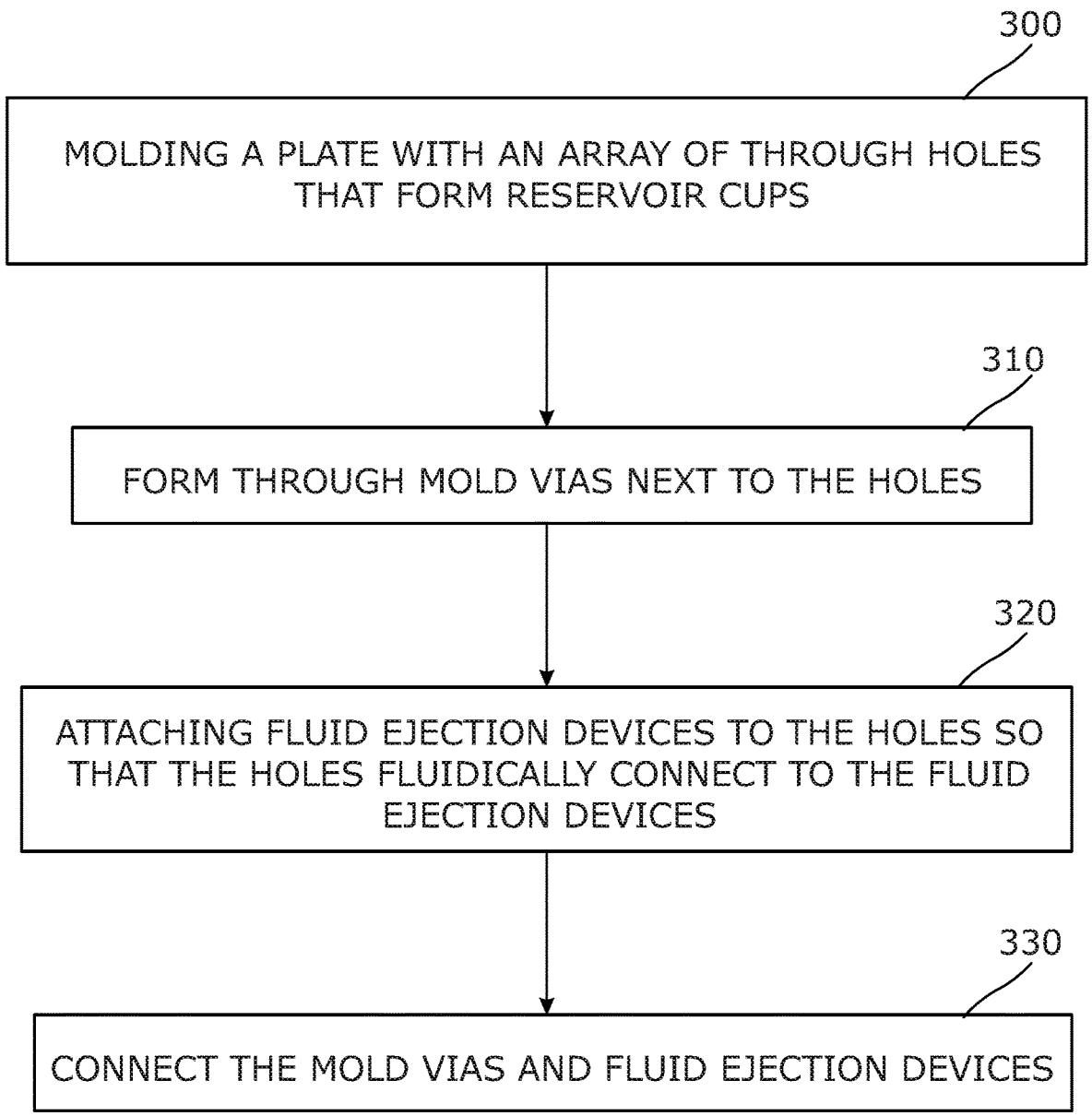
FIG. 18 illustrates another example of a method of manufacturing a digital titration cassette.

FIG. 18 illustrates yet another example of a method of manufacturing a digital titration cassette. The method includes molding a monolithic carrier structure with an array of through holes that are to form reservoir cups for receiving and delivering fluid (block 300). The method further includes forming TMVs next to the through holes (block 310). In one example the TMVs connect to electrical routing that is applied to both sides of the monolithic carrier structure in order to electrically connect fluid dispense devices on one side with contact pad arrays on the other side. The electrical routing may be applied using MID and/or LDS techniques and/or other techniques such as patterning printed circuit layers in PCBs or by using flexible circuits. The method further includes attaching fluid dispense devices to the monolithic carrier structure over the through holes, opposite to the cupped holes, so that the holes fluidically connect to the fluid dispense devices (block 320). The method further includes connecting the TMVs with the fluid ejection devices (block 330), for example through wire bonding and/or solder paste. In a further example the bond wires and/or TMVs may be encapsulated.

As illustrated in the examples of FIGS. 3B, 4, 6-10, and 14, most of the length of the electrical routings extends along the planar monolithic carrier structure, parallel to the monolithic carrier structure, except where it passes through the carrier structure by means of vias. Also, the contact pad arrays may generally extend on the surface of a planar monolithic carrier structure, parallel to the monolithic carrier structure. In addition, nozzles of nozzle arrays may extend through a plane that is parallel to the main surfaces of the monolithic carrier structure. Herein, the plane can be defined by the plane of the view of FIGS. 2, 3B, 3C, 4, 5A-5D, 9, 10, or the length direction L that is illustrated in FIG. 1.

In certain examples of this disclosure the pitch of the fluid dispense devices is aligned with a pitch of wells in existing well plates. For example, certain well pitches of existing well plates are 750 micron and 9 millimeters. Accordingly, the pitch of fluid dispense devices can be 9 millimeters or a multitude of 750 micron. In the examples of this disclosure, the pitch of reservoirs in one row of reservoirs can be a discrete number times the pitch of fluid dispense devices in one row. For example where the pitch of the fluid dispense devices is 750 micron or a multitude thereof, for example 1.5 or 3 millimeter, the pitch of the reservoirs may be a discrete number times that pitch, for example 0.75, 1.5, 3, 6, 12 millimeters, etc. Fluid routing can be provided to route fluid from one reservoir to a plurality of fluid dispense devices.

The different dispense apparatus described in this disclosure may be relatively planar or planar. With "planar" it may be understood that the array 1 has a thickness T (e.g. see FIG. 1) that is at least three times or at least five times less than a width of the dispense apparatus. In FIG. 1 the width extends into the page. The length L of the dispense apparatus may be more than the width wherein the length and width of the array may form a main plane along which the monolithic carrier structure extends. For example, a total length of the cassette may be between approximately 50 and 300 millimeters, for example approximately 100 millimeters, and a total width may be between approximately 15 and approximately 200 millimeters, for example approximately 35 millimeters, not counting a protruding grip (where present), or for example approximately 20 millimeters longer including the grip. A maximum thickness of such dispense apparatus, between a top side and a bottom side, could be less than 10 millimeters, for example less than 6 millimeters, for example less than 5 millimeters, for example approximately 4 millimeters. For example the dispense apparatus can be similarly shaped as the examples of FIGS. 6, 7, 10, 13 and 14.

One of the aspects of this disclosure is about using one monolithic carrier structure or a plurality of parallel monolithic carrier structures that each carry relatively large arrays of components such as reservoirs, fluid passages, fluid devices, electrical routing, etc. Also, the monolithic carrier structure may include cut out fluid routing to rout the fluid from the reservoir to the die. In one example the fluid flows directly from the reservoir to the die.

In an example, each reservoir of this disclosure is shaped to hold fluid volumes of approximately 200 microliter or less, approximately 100 microliter or less, approximately 50 microliter or less or approximately 20 microliter or less.

Each fluid dispense device of this disclosure can be composed of, or part of, a thin sliver die. A thin sliver die may have a thickness of approximately 0.9 millimeters or less, 0.5 millimeters or less, 300 micron or less, 200 micron or less or 150 micron or less. The width of each die can be approximately 1 millimeter or less, 0.5 millimeters or less, for example approximately 0.3 millimeters. The length of each die may depend on the pitch and the chosen number of fluid dispense devices it incorporates. For example the length of the die can be between approximately 1 and 80 millimeters.

The fluid dispense die technology may be leveraged from inkjet printhead technology, for example piezo or thermal inkjet technology. In different examples of this disclosure, a number of fluid dispensing nozzles per fluid dispense device may vary from 1 nozzle to approximately 1000 nozzles, for example between 5 and 600 nozzles, for example approximately 100 nozzles, not counting dummy nozzles or sensing nozzles, if any.

In the examples of this disclosures, fluid flow actuators may include thermal actuators or piezo actuators. These actuators may form part of the die. The dispense apparatus may be void of other fluid flow actuators outside of the die. For example, fluid flow may be established by at least one of fluid actuators, gravity, and capillary forces. No further proactive backpressure regulation needs to be provided. For example, no filter, no capillary media, etc.

Although this disclosure has mostly addressed digital titration cassettes, the disclosed features can apply to any digital dispense apparatus having similar features and should not be interpreted as limiting to titration applications only.

What is claimed is:

1. A digital dispense apparatus, comprising:
   a first monolithic carrier structure including a plurality of fluid dispense devices, each fluid dispense device including at least one nozzle,
   a second monolithic carrier structure including at least one reservoir fluidically connected to the plurality of fluid dispense devices to deliver fluid to the plurality of fluid dispense devices,
   a third monolithic carrier structure including a contact pad array wherein each contact pad of the contact pad array is electrically connected to the plurality of fluid dispense devices to drive the plurality of fluid dispense devices, and
   electrical routing to electrically connect the plurality of fluid dispense devices to the contact pad array, wherein the electrical routing includes electrical traces extending through the first monolithic carrier structure to connect to the plurality of fluid dispense devices.

2. The digital dispense apparatus of claim 1, wherein the electrical routing comprises interconnect traces that connect functional contact pads of the contact pad array to the plurality of fluid dispense devices.

3. The digital dispense apparatus of claim 1, wherein the first monolithic carrier structure is planar.

4. The digital dispense apparatus of claim 3, wherein
   the contact array extends in one plane,
   the at least one nozzle extends in one plane,
   the at least one reservoir extends through one plane, most of the lengths of the interconnect traces extend in one plane, and said planes extend parallel to each other.

5. The digital dispense apparatus of claim 1, wherein the fluid dispense devices are embedded in the first monolithic carrier structure.

6. The digital dispense apparatus of claim 1, wherein the at least one reservoir is defined by surfaces of the second monolithic carrier structure so that when filled the second monolithic carrier structure is in direct contact with the fluid to receive the fluid from an external source and guide the fluid to the fluid dispense devices.

7. The digital dispense apparatus of claim 1, wherein at least one cut out defines the at least one reservoir.

8. The digital dispense apparatus of claim 1, comprising at least one die that defines the plurality of fluid dispense devices, wherein the die is provided at a side of the first monolithic carrier structure that is opposite to the at least one reservoir, wherein the electrical routing comprises interconnect traces provided through the first monolithic carrier structure to connect the contact pad array to the plurality of fluid dispense devices.

9. The digital dispense apparatus of claim 8 including fluid routing between the reservoir and the die so that in operation fluid routing walls, downstream of the reservoir, are in contact with fluid to guide fluid from the reservoir to the die.

10. A digital titration cassette, comprising a first monolithic carrier structure that carries
a plurality of fluid dispense devices, and
interconnect traces connected to the plurality of fluid dispense devices;

a second monolithic carrier structure including at least one reservoir fluidically connected to the plurality of fluid dispense devices to deliver fluid to the plurality of fluid dispense devices; and a third monolithic carrier structure including at least one contact pad array electrically connected to the plurality of fluid dispense devices by the interconnect traces, so as to connect to host device electrodes to drive the fluid dispense devices;

wherein the interconnect traces extend through the first monolithic carrier structure.

11. The digital titration cassette of claim 10, further comprising a plurality of fluid dispense dies to define the plurality of fluid dispense devices, the plurality of fluid dispense dies having thicknesses of less than approximately 0.9 millimeters and including fluid actuators to dispense fluid, wherein the third monolithic carrier structure carries the plurality of fluid dispense dies and the interconnect traces;

wherein the at least one reservoir is open at the top to receive fluid;

wherein part of the fluid routing is formed by the carrier structure; and wherein the plurality of fluid dispense dies provide for more than eight fluid dispense devices.

12. A method of manufacturing a digital titration cassette, comprising molding a first monolithic carrier structure having a reservoir array, providing a second monolithic carrier structure including at least one contact pad array and electrical routing on the second monolithic carrier structure, wherein the electrical routing extends through the first monolithic carrier structure, attaching a plurality of fluid dispense devices to a third monolithic carrier structure, and wire bonding the electrical routing to dispense dies that define the plurality of fluid dispense devices.

13. The method of claim 12, wherein attaching the plurality of fluid dispense devices to the third monolithic carrier structure comprises overmolding the plurality of fluid dispense devices into the first monolithic carrier structure at one side of the first monolithic carrier structure, the method further comprising:

providing fluid routing in the first monolithic carrier structure, and disposing the reservoir array and the at least one contact pad array on an opposite side of the first monolithic carrier structure.

14. The method of claim 12, wherein molding the first monolithic carrier structure comprises molding the first monolithic carrier structure with an array of through holes that are to form reservoir cups, the method further comprising:

forming TMVs (through mold vias) next to the array of through holes, wherein the plurality of fluid dispense devices are attached to the array of through holes, opposite to the cups, to fluidically connect to the array of through holes, and connecting the TMVs and the plurality of fluid dispense devices.

* * * * *